(12) United States Patent
Graham et al.

(10) Patent No.: US 7,747,088 B2
(45) Date of Patent: Jun. 29, 2010

(54) SYSTEM AND METHODS FOR PERFORMING DEBLOCKING IN MICROPROCESSOR-BASED VIDEO CODEC APPLICATIONS

(75) Inventors: Carl Norman Graham, London (GB); Kar-Lik Wong, Wokingham (GB); Simon Jones, London (GB); Aris Aristodemou, Friem Barnet (GB); Yazid Nemouchi, Sandhurst (GB)

(73) Assignee: ARC International (UK) Limited, Elstree, Herts (GB)

( * ) Notice: Subject to any disclaimer, the term of this patent is extended or adjusted under 35 U.S.C. 154(b) by 914 days.

(21) Appl. No.: 11/528,327

(22) Filed: Sep. 28, 2006

(65) Prior Publication Data

US 2007/0071106 A1    Mar. 29, 2007

Related U.S. Application Data

(60) Provisional application No. 60/721,108, filed on Sep. 28, 2005.

(51) Int. Cl.
*G06K 9/36* (2006.01)
*G06K 9/40* (2006.01)
*H04B 1/66* (2006.01)

(52) U.S. Cl. .................. 382/232; 382/268; 375/240

(58) Field of Classification Search ......... 382/232–254, 382/268; 375/240, 240.24
See application file for complete search history.

(56) References Cited

U.S. PATENT DOCUMENTS 5,422,964 A * 6/1995 Devimeux et al. .......... 382/226
5,884,057 A   3/1999 Blomgren et al.
5,892,847 A   4/1999 Johnson
5,923,892 A   7/1999 Levy
5,937,202 A   8/1999 Crosetto (Continued)

FOREIGN PATENT DOCUMENTS

EP    1 503 595    2/2005

(Continued)

OTHER PUBLICATIONS

Smith, et al, "The Astronautics ZS-1 Processor", Proceedings of the International Conference on Computer Design : VLSI in Computers and Processors (ICCD). New York, 10/3-5; pp. 307-310.

(Continued)

*Primary Examiner*—Manav Seth
(74) *Attorney, Agent, or Firm*—Ropes & Gray LLP (57) ABSTRACT

Two pairs of deblock instructions for performing deblock filtering on a horizontal row of pixels according to the H.264 (MPEG 4 part 10) and VC1 video codec algorithms. The first instruction of each pair has three 128-bit operands comprising the 16-bit components of a horizontal line of 8 pixels crossing a vertical block edge between pixels 4 and 5 in a YUV image, a series of filter threshold parameters, and a 128-bit destination operand for storing the output of the first instruction. The second instruction of each pair accepts the same 16-bit components as its first input, the output of the first instruction as its second input and a destination operand for storing an output of the second instruction as its third input. The instruction pairs are intended for use with the H.264 or VC1 video codecs respectively.

33 Claims, 10 Drawing Sheets

U.S. PATENT DOCUMENTS

| | | | |
|---|---|---|---|
| 6,377,970 B1* | 4/2002 | Abdallah et al. ............ 708/603 |
| 6,518,974 B2 | 2/2003 | Taylor et al. |
| 6,757,019 B1 | 6/2004 | Hsieh et al. |
| 6,853,683 B2* | 2/2005 | Song et al. ............ 375/240.25 |
| 6,865,663 B2 | 3/2005 | Barry |
| 6,950,929 B2 | 9/2005 | Chung et al. |
| 7,050,504 B2* | 5/2006 | Joch et al. ............ 375/240.26 |
| 7,079,147 B2 | 7/2006 | Wichman et al. |
| 7,180,943 B1 | 2/2007 | Arlid et al. |
| 7,215,823 B2* | 5/2007 | Miura et al. ............ 382/268 |
| 7,277,592 B1* | 10/2007 | Lin ............ 382/268 |
| 7,336,720 B2* | 2/2008 | Martemyanov et al. 375/240.12 |
| 7,424,501 B2* | 9/2008 | Macy, Jr. ............ 708/300 |
| 7,457,362 B2* | 11/2008 | Sankaran ............ 375/240.24 |
| 7,539,714 B2* | 5/2009 | Macy et al. ............ 708/200 |
| 2003/0123748 A1 | 7/2003 | Sebot et al. |
| 2003/0131030 A1 | 7/2003 | Sebot et al. |
| 2004/0054877 A1* | 3/2004 | Macy et al. ............ 712/221 |
| 2004/0267856 A1* | 12/2004 | Macy, Jr. ............ 708/524 |
| 2006/0047934 A1 | 3/2006 | Schmisseur et al. |
| 2007/0070080 A1 | 3/2007 | Graham et al. |
| 2007/0071101 A1 | 3/2007 | Topham |
| 2007/0073925 A1 | 3/2007 | Lim et al. |
| 2007/0074004 A1 | 3/2007 | Wong et al. |
| 2007/0074007 A1 | 3/2007 | Topham et al. |
| 2007/0074012 A1 | 3/2007 | Graham et al. |

FOREIGN PATENT DOCUMENTS

| | | |
|---|---|---|
| GB | 2365583 | 2/2002 |
| WO | WO-93-08526 | 4/1993 |
| WO | WO 2006/096612 | 9/2006 |

OTHER PUBLICATIONS

Osako, F., et al., "A Dynamic Computation Resource Scalable Algorithm for Software Video CODEC," NTG Fachberichte, VDE Verlag, 143:515-518 (1997).

Ray, A., et al., "Complexity-Distortion Analysis of H.264/JVT Decoders on Mobile Devices," Picture Coding Symposium PSC, http://www.egr.msu/edu/waves/people/Radha_files/2004/PSC04.pdf (2004).

Wiegand, T., et al., "Rate-Constrained Coder Control and Comparison of Video Coding Standards," IEEE Transactions on Circuits and Systems for Video Technology, 13(7):688-703 (2003).

* cited by examiner

WC IFT VR$_a$, VR$_b$, VR$_c$

SYSTEM AND METHODS FOR PERFORMING DEBLOCKING IN MICROPROCESSOR-BASED VIDEO CODEC APPLICATIONS

CROSS REFERENCE TO RELATED APPLICATIONS

This application claims priority to U.S. Provisional Patent Application No. 60/721,108 titled "SIMD Architecture and Associated Systems and Methods," filed Sep. 28, 2005, the disclosure of which is hereby incorporated by reference in its entirety.

FIELD OF THE INVENTION

The invention relates generally to embedded microprocessor architecture and more specifically to systems and methods for performing deblocking in H.264 (MPEG 4 part 10) and VC1 microprocessor-based video codecs.

BACKGROUND OF THE INVENTION

Single instruction multiple data (SIMD) architectures have become increasingly important as demand for video processing in electronic devices has increased. The SIMD architecture exploits the data parallelism that is abundant in data manipulations often found in media related applications, such as discrete cosine transforms (DCT) and filters. Data parallelism exists when a large mass of data of uniform type needs the same instruction performed on it. Thus, in contrast to a single instruction single data (SISD) architecture, in a SIMD architecture a single instruction may be used to effect an operation on a wide block of data. SIMD architecture exploits parallelism in the data stream while SISD can only operate on data sequentially.

An example of an application that takes advantage of SIMD is one where the same value is being added to a large number of data points, a common operation in many media application. One example of this is changing the brightness of a graphic image. Each pixel of the image may consist of three values for the brightness of the red, green ad blue portions of the color. To change the brightness, the R, G and B values, or alternatively the YUV values are read from memory, a value is added to it, and the resulting value is written back to memory. A SIMD processor enhances performance of this type of operation over that of a SISD processor. A reason for this improvement is that in SIMD architectures, data is understood to be in blocks and a number of values can be loaded at once. Instead of a series of instructions to incrementally fetch individual pixels, a SIMD processor will have a single instruction that effectively says "get all these pixels" Another advantage of SIMD machines is multiple pieces of data are operated on simultaneously. Thus, a single instruction can say "perform this operations on all the pixels." Thus, SIMD machines are much more efficient in exploiting data parallelism than SISD machines.

A disadvantage of SIMD system is that they can require additional memory registers to support data which increases processor complexity and cost or they share resources such as registers with processing units of the CPU. This can cause competition for resources, conflicts, pipeline stalls and other events that adversely effect overall processor performance. A major disadvantage of SIMD architecture is the rigid requirement on data arrangement. The overhead to rearrange data in order to exploit data parallelism can significantly impact the speedup in computation and can even negate the performance gain achievable by a SIMD machine in comparison to a conventional SISD machine. Also, attaching a SIMD machine as an extension to a conventional SISD machine can cause various issues like synchronization, decoupling, etc.

SUMMARY OF THE INVENTION

Thus, there exists a need for a SIMD microprocessor architecture that ameliorates at least some of the above-noted deficiencies of conventional systems. Therefore, at least one embodiment of this invention provides 2 pairs of microprocessor instructions for performing a deblock operation as specified by the H.264 and VC1 codecs on a horizontal row of pixels across a vertical block edge. Each pair of instructions according to this embodiment may comprise a first instruction having three 128-bit input operands comprising the 16-bit components of a horizontal line of 8 pixels in a YUV image a first input, a series of filter threshold parameters as a second input operand, and a 128-bit destination operand for storing the output of the first instruction as a third input operand, and a second instruction having three 128-bit operands comprising the same row pixels as in the first instruction as a first input operand, the output of the first instruction as a second input operand and a destination operand of a 128-bit register for storing an output of the second instruction.

At least one embodiment of the invention provides a method of causing a microprocessor to perform a CODEC deblocking operation on a horizontal row of image pixels. The method according to this embodiment comprises providing a first instruction to the microprocessor having three 128-bit operands comprising the 16-bit components of a horizontal row of pixels in a YUV image as a first input operand, wherein the horizontal row of pixels are in image order and include four pixels on either side of a pixel block edge, at least one filter threshold parameter as a second input operand, and a 128-bit destination operand for storing the output of the first instruction as a third operand, calculating an output value of the first instruction, and storing the output value of the first instruction in the 128-bit destination register. The method according to this embodiment also comprises providing a second instruction to the microprocessor having three 128-bit operands comprising the first input operand of the first instruction as the first input operand, the output of the first instruction as a second input operand, and a destination operand of a 128-bit register for storing an output of the second instruction as the third operand, calculating an output value of the second instruction, and storing the output value in the 128-bit register specified by the destination operand of the second instruction.

Another embodiment according to the invention provides a method of performing a deblock operation on a horizontal row of 8 pixels with a pair of three input operand, assembly language-based instructions. The method according to this embodiment comprises selecting the 16-bit components of a horizontal row of eight pixels in a YUV image as a first input operand of a first instruction, wherein the row of eight pixels comprises four horizontal pixels in image order on either side of a block edge, defining at least one filter threshold parameter as a second input operand of the first instruction, calculating a first intermediate value based on the first input operand and second input operand, and storing the first intermediate value in a 128-bit destination register specified by a third input operand of the first instruction. The method according to this embodiment also comprises selecting the same pixel inputs as the first input operand of a second instruction, selecting the first intermediate value as a second input operand of the second instruction, calculating an output value of second instruction based on first input operand and second input operand of the second instruction, and storing the output value of the second instruction in a 128-bit destination register specified by a third input operand of the second instruction.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The following description is intended to convey a thorough understanding of the embodiments described by providing a number of specific embodiments and details involving performing deblocking operations in microprocessor-based video codecs. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
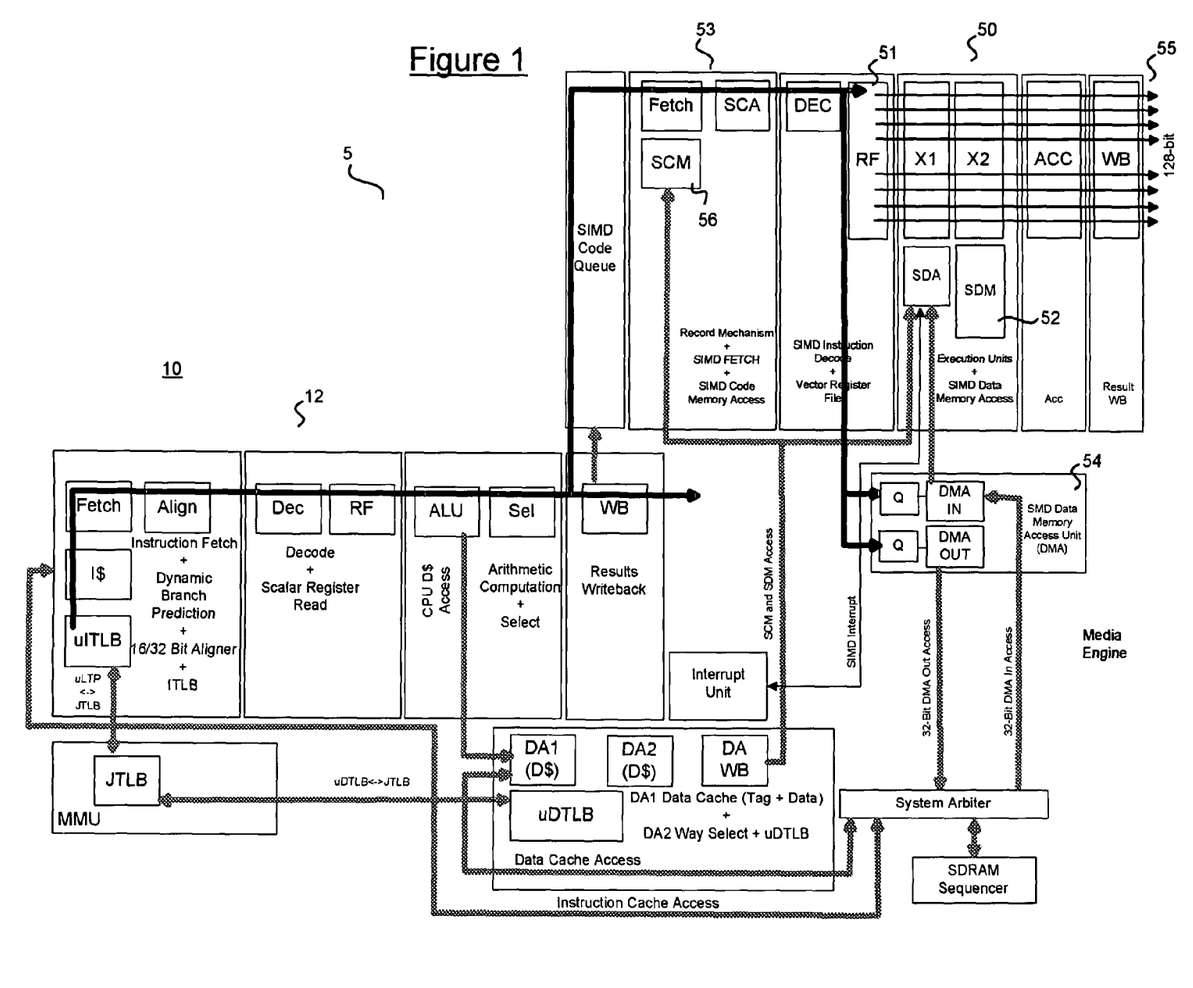
FIG. 1 is a functional block diagram illustrating an architecture for a microprocessor-based system including a main processor core and a SIMD media accelerator according to at least one embodiment of the invention.

Referring now to FIG. 1, a functional block diagram illustrating a microprocessor-based system 5 including a main processor core 10 and a SIMD media accelerator 50 according to at least one embodiment of the invention is provided. The diagram illustrates a microprocessor 5 comprising a standard single instruction single data (SISD) processor core 10 having a multistage instruction pipeline 12 and a SIMD media engine 50. In various embodiments, the processor core 10 may be a processor core such as the ARC 700 embedded processor core available from ARC International Limited of Elstree, United Kingdom, and as described in provisional patent application No. 60/572,238 filed May 19, 2004 entitled "Microprocessor Architecture" which, is hereby incorporated by reference in its entirety. Alternatively, in various embodiments, the processor core may be a different processor core.

In various embodiments, a single instruction issued by the processor pipeline 12 may cause up to sixteen 16-bit elements to be operated on in parallel through the use of the 128-bit data path 55 in the media engine 50. In various embodiments, the SIMD engine 50 utilizes closely coupled memory units. In various embodiments, the SIMD data memory 52 (SDM) is a 128-bit wide data memory that provides low latency access to perform loads to and stores from the 128-bit vector register file 51. The SDM contents are transferable via a DMA unit 54 thereby freeing up the processor core 10 and the SIMD core 50. In various embodiments, the DMA unit 54 comprises a DMA in engine 61 and a DMA out engine 62. In various embodiments, both the DMA in engine 61 and DMA out engine 62 may comprise instruction queues (labeled Q in the Figure) for buffering one or more instructions. In various embodiments, a SIMD code memory 56 (SCM) allows the SIMD unit to fetch instructions from a localized code memory, allowing the SIMD pipeline to dynamically decouple from the processor core 10 resulting in truly parallel operation between the processor core and SIMD media engine as discussed in commonly assigned U.S. patent application Ser. No. 11/528,338, titled, "Systems and Methods for Recording Instruction Sequences in a Microprocessor Having a Dynamically Decoupleable Extended Instruction Pipeline," filed concurrently herewith, the disclosure of which is hereby incorporated by reference in its entirety.

Therefore, in various embodiments, the microprocessor architecture according to various embodiments of the invention may permit the processor to operate in both closely coupled and decoupled modes of operation. In the closely coupled mode of operation, the SIMD program code fetch and program stream supply is exclusively handled by the processor core 10. In the decoupled mode of operation, the SIMD pipeline 53 executes code from a local memory 56 independent of the processor core 10. The processor core 10 may control the SIMD pipeline 53 to execute video tasks such as audio processing, entropy encoding/decoding, discrete cosine transforms (DCTs) and inverse DCTs, motion compensation and de-block filtering.

As noted above, the SIMD architecture is particularly well suited for applications such a media processing including audio, images and video due to the fact that a few operations are repeatedly performed on relatively large blocks of data. This makes the SIMD architecture ideal for implementing video compression/decompression (codec) algorithms. Video codecs are at the heart of nearly all modern digital video products including DVD players, cameras, video-enabled communication devices, gaming systems, etc.

Most image and video compression algorithms take advantage of redundancy in the image and even in successive frames to store less than all the information necessary to fully characterize the image. As a result, these algorithms are considered "lossy." That is, the original uncompressed image can not be perfectly (from a mathematical perspective) reconstructed from the comprised data because some data has been lost in the compression process. Thus, compression is inherently a balancing act between the competing goals of minimizing the number of bits required to represent the image and ensuring that the differences between the original (uncompressed) image and the reconstructed image are minimized or at least not perceptible or objectionable to the human eye.

Ideally, lossy image and video compression algorithms discard only perceptually insignificant information so that to the human eye the reconstructed image or video sequence appears identical to the original uncompressed image or video. In practice, some artifacts may be visible. This can be attributed to poor encoder implementation, video content that is particularly challenging to encode, or a selected bit rate that is too low for the video sequence, resolution and frame rate.

Two types of artifacts, "blocking" and "ringing" are common in block-based lossy video compression applications. Blocking artifacts are due to the fact that compression algorithms divide each frame into blocks of 8×8 pixels, 16×16 pixels, etc. Each block is reconstructed with some small errors, and the errors at the edge of a block often contrast with the errors at the edges of neighboring blocks, making block boundaries visible. Ringing artifacts appear as distortions or blurs around the edges of image features. Ringing artifacts are due to the encoder discarding too much information in quantizing the high-frequency transform coefficients.

Video compression applications often employ filters following decompression to reduce blocking and ringing artifacts. These filtering steps are known as "deblocking" and "deringing," respectively. Both deblocking and deringing may be performed using low-pass FIR (finite impulse response) filters to hide these visible artifacts.

Two emerging video codec standards designed to facilitate high quality video required by today's electronic devices are the H.264 and VC1 standards. H.264 was jointly developed by the Moving Picture Experts Group (MPEG) and the International Telecommunication Union (ITU). It is also known as MPEG-4 Part 10 Advanced Video Coding (AVC). VC1 is a video codec specification based on MICROSOFT WINDOWS Media Video (WMV) 9 compression technology that is currently being standardized by the Society of Motion Picture and Television Engineers (SMPTE).

One key attribute of a video compression application is the bit-rate of the compressed video stream. Codecs that target specific applications are designed to stay within the bit-rate constraints of these applications, while offering acceptable video quality. DVDs use 6-8 Mbps with MPEG-2 encoding. However, emerging digital video standards such as HDTV and HD-DVD can demand up to 20-40 Mbps using MPEG-2. Such high bit-rates translate into huge storage requirements for HD-DVDs and a limited number of HDTV channels. Thus, a key motivation for developing a new codec is to lower the bit-rate while preserving or even improving the video quality relative to MPEG-2. This was the motivation that led to the development of both the H.264 and VC1 codecs. These codecs achieve significant advances in improving video quality and reducing bandwidth, but at the cost of greatly increased computational complexity at both the encoder and decoder.

A deblocking filter operation is specified by both the H.264 and VC1 codecs in order to remove blocking artifacts from each reconstructed frame that are introduced by the lossy, block-based operations. Each video frame is divided into 16×16 pixel macroblocks and each macroblock is further divided into sub-blocks of various sizes for transforms. The deblocking filter is applied to all the edges of such sub-blocks. For each block, vertical edges are filtered from left to right first and then horizontal edges are filtered from top to bottom. The deblocking process is repeated for all macroblocks in a frame.

When source data is organized as a standard bitmap such that wide data operations can access several horizontally adjacent pixels in one memory operation, the process of applying the filter to columns of 8 pixels vertically can be done efficiently by standard SIMD methodology, that is, applying an instruction to more than one column of pixels at one time. However, this type of memory organization is not suitable for performing the same operation on pixel data within the same row. Thus, in various embodiments, a pair of instructions are provided that enable a processor such as a SIMD media processor with 128-bit wide registers to perform the same filter operation on luma components of 8 adjacent pixels on a horizontal line without first re-ordering the data into columns in either the H.264 or VC1 codec implementations.

An advantage of these block filter instructions over traditional SIMD techniques is that adjacent data elements within a row can be loaded into a vector register as in a typical column-based operation, but instead of performing the same operation on each slice, a dedicated data path is used to compute the entire horizontal computation without the need to first re-arrange the data in memory which would incur a high overhead.

Figure 2:
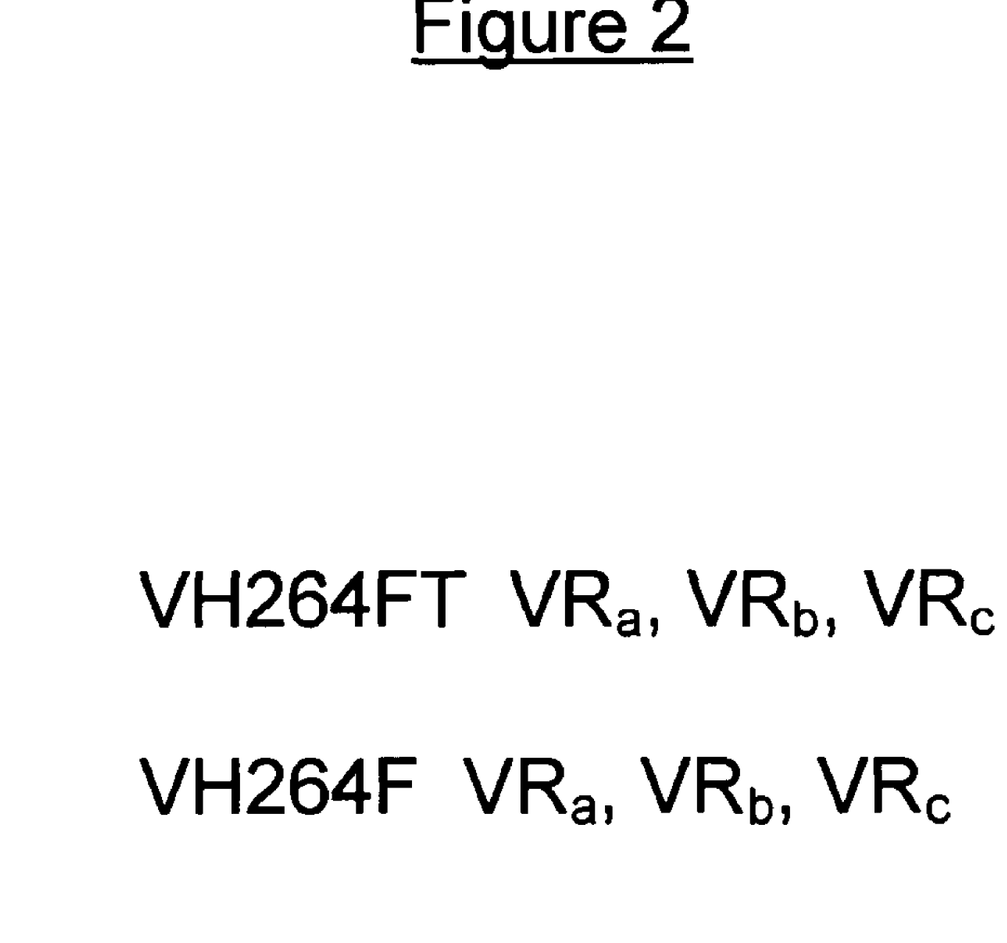
FIG. 2 is a pair of SIMD instructions that are each pipelined to a single slot cycle with a three cycle latency for implementing the H.264 deblock filter operation on a horizontal line of pixels according to at least one embodiment of the invention.
Figure 3:
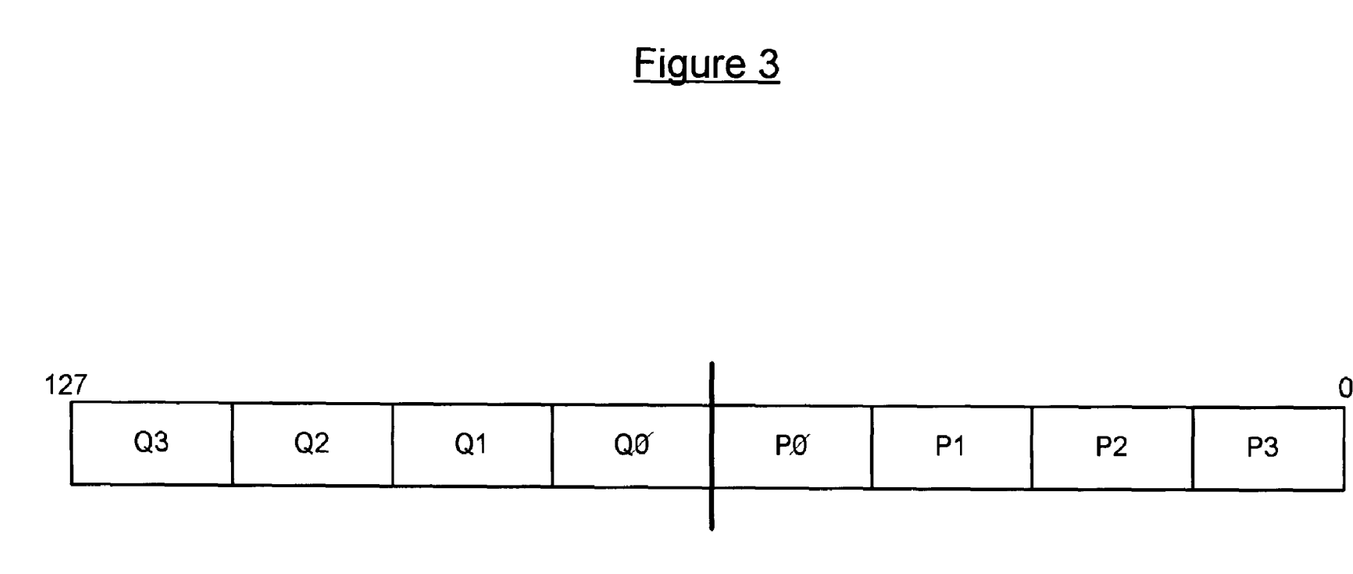
FIG. 3 is a block diagram illustrating the contents of a 128-bit register containing the first input operand to the deblock instruction of FIG. 3 according to at least one embodiment of the invention.
Figure 4:
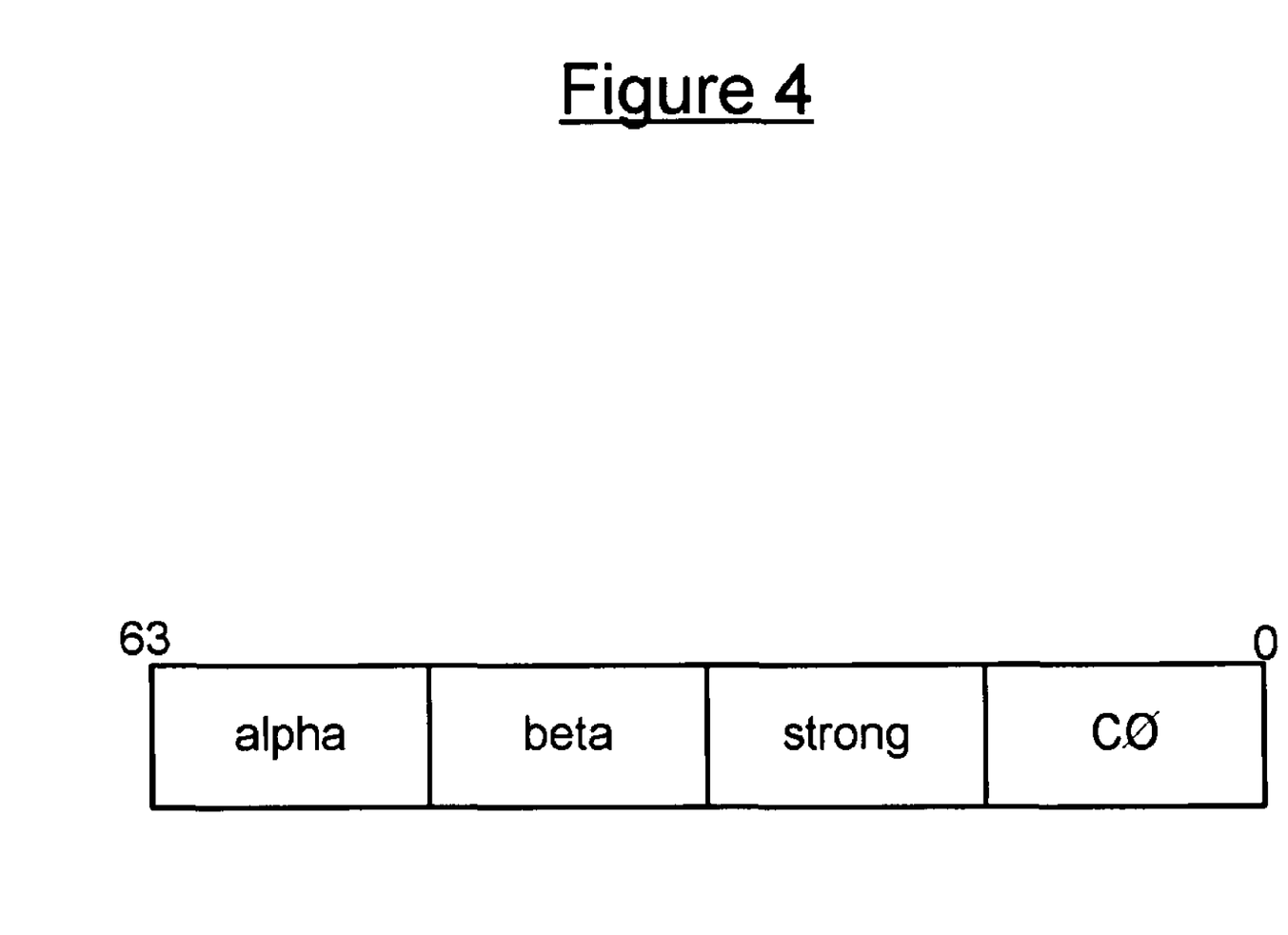
FIG. 4 is a block diagram illustrating the contents of a 128-bit register containing the second input operand to the deblock instruction of FIG. 3 according to at least one embodiment of the invention.

FIG. 2 depicts a pair of SIMD assembler instructions that are each pipelined to a single slot cycle with a three cycle latency for implementing the H.264 deblock filter operation on a horizontal line of pixels according to at least one embodiment of the invention. The instructions are formatted by name, output register $VR_a$, first input register $VR_b$ and second input register $VR_c$. FIG. 3 illustrates the contents of the 128-bit register $VR_b$ containing the first input operand to both deblock instructions VH264FT and VH264F of FIG. 2. The input comprises a 128-bit wide data consisting of a horizontal row of eight pixels (represented as 16-bit values) from two pixel blocks, that is a horizontal row of eight 16-bit pixels that span a block edge between the fourth and fifth pixels. The first input to each of these instructions is 8 16-bit luma values of 8 pixels in a row. FIG. 4 illustrates the contents of a 128-bit register containing the second input operand $VR_c$ to the deblock instruction VH264FT of FIG. 2. Only the lower half of the 128-bit register is used. The lower 64-bits contain the H.264 filter threshold parameters alpha and beta, the strong flag and the filter strength C0. These parameters are derived directly from clauses 8.7.2.1 and 8.7.2.2 the H.264 specification. The H.264 Specification ITU-T Recommendation H.264 & ISO/IEC 14496-10 (MPEG-4) AVC, "Advanced Video Coding for Generic Audiovisual Services," Version 3:2005, and the VC1 Specification, SMPTE 421M, "Proposed SMPTE Standard for Television: VC-1 Compressed Video Bitstream Format and Decoding Process," Aug. 23, 2005, are both hereby incorporated by reference in their entirety into this disclosure.

Figure 5:
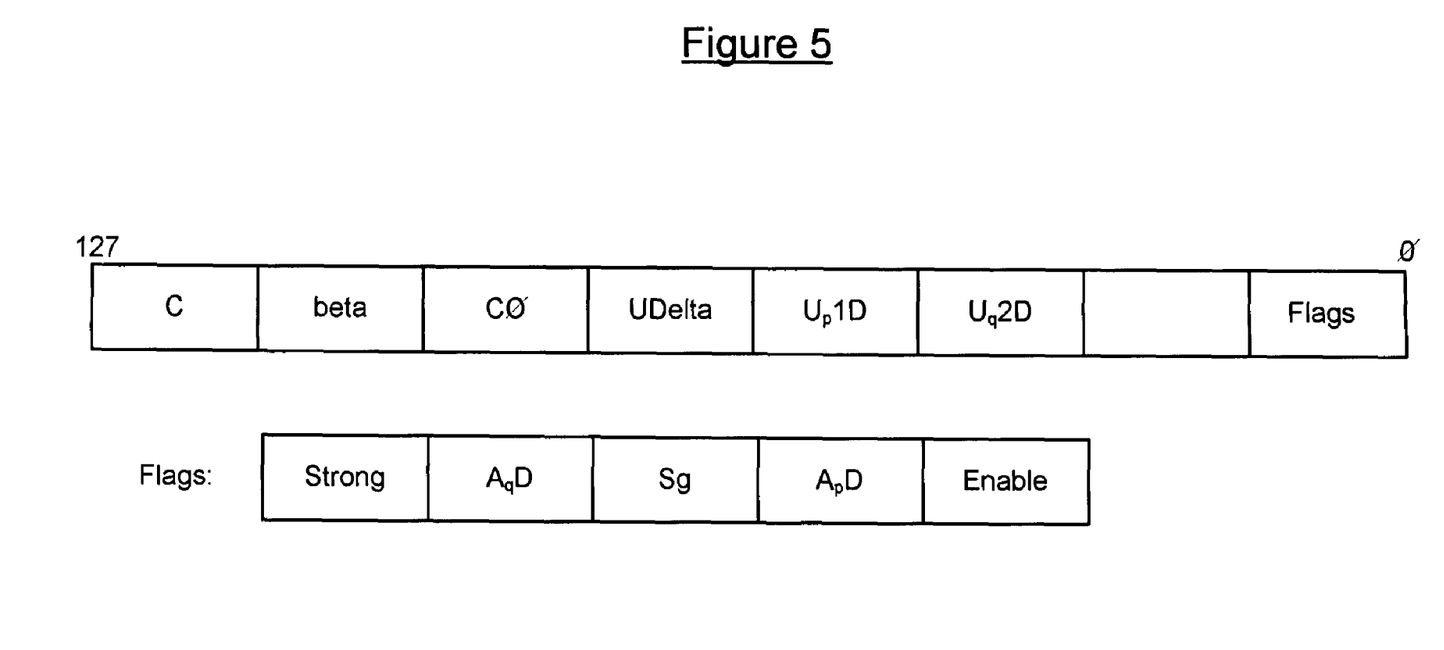
FIG. 5 is a block diagram illustrating the contents of a 128-bit register containing the output of the first deblock instruction split into eight 16-bit fields which is used as the second input operand to the second deblock instruction according to at least one embodiment of the invention.

FIG. 5 illustrates the contents of a 128-bit register $VR_a$ containing the output of the first deblock instruction VH264FT split into eight 16-bit fields: C, beta, C0, Udelta, Up1D, Uq1D and Flags, which are derived from the inputs in accordance with Table 1.1 below:

TABLE 1.1

| Name | Symbol | Value |
|---|---|---|
| Small gap | Sg | $|p0 - q0| < (2 + (alpha >> 2))$ |
| beta | beta | beta |
| Strong | Strong | Strong |
| P threshold | ApD | $|p2 - p0| < beta$ |
| Q threshold | AqD | $|q2 - q0| < beta$ |
| Strength raw | C0 | C0 |
| Strength | C | C0 + ApD + AqD |
| Unclamped delta | Udelta | $(P1 - 4p0 + 4q0 - q1 + 4) >> 3$ |
| Unclamped int | Up1D | $(p2 + ((p0 + q0 + 1) >> 1) + 2p1) >> 1$ |
| Unclamped int | Uq1D | $(g2 + ((p0 + q0 + 1) >> 1) + 2q1) >> 1$ |
| Filter enable | Enable | $|p1 - p0| < beta \&\& |q1 - q0| < beta \&\& |p0 - q0| < alpha$ |

Figure 6:
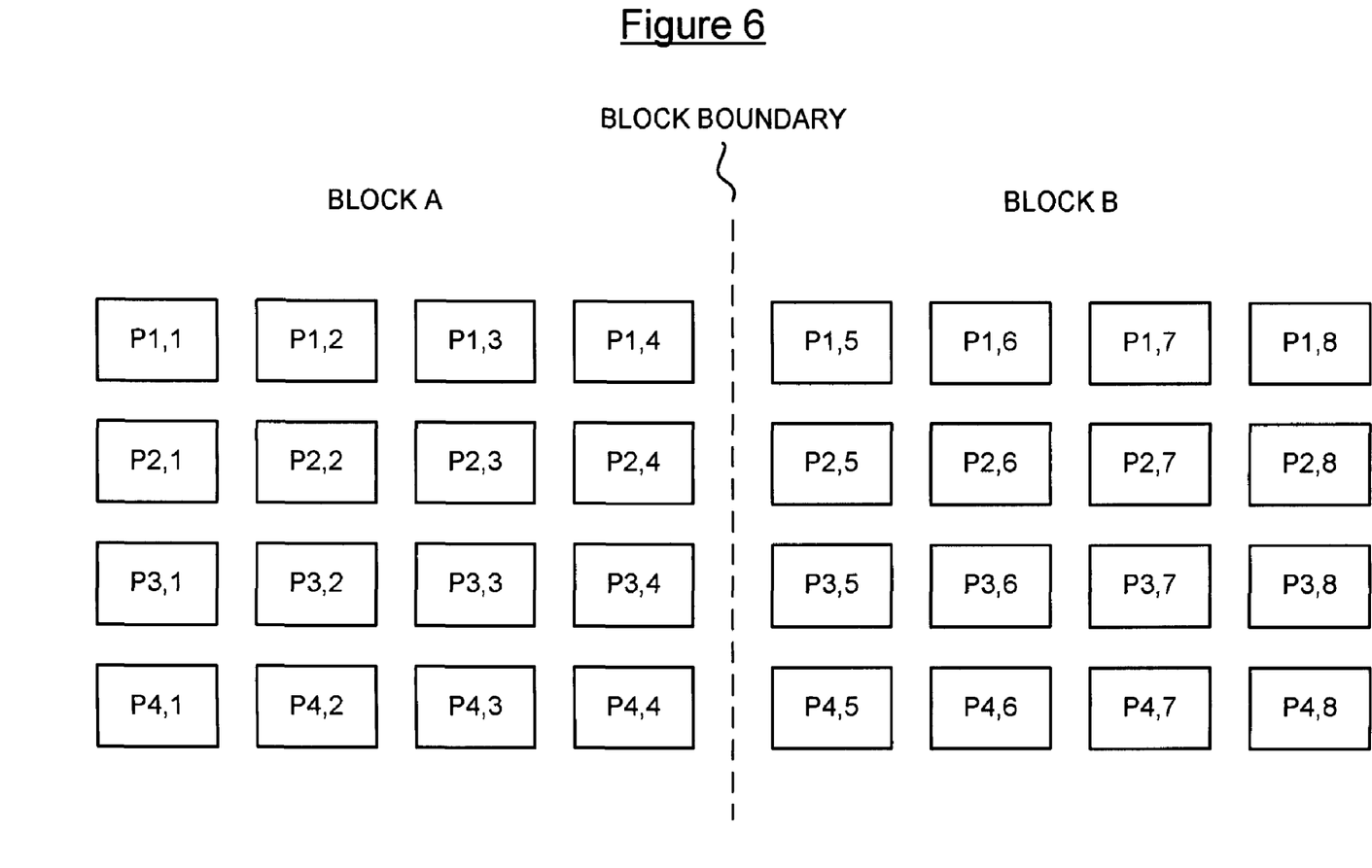
FIG. 6 is a pixel diagram illustrating the 4×8 block of pixels for processing with a pair of deblock instructions according to at least one embodiment of the invention.

The second instruction VH264F of FIG. 2 takes the same 8 pixels input to the VH264FT instruction as its first input operand $VR_b$ and the output of the first instruction depicted in FIG. 6 as the second input operand $VR_c$. The output of the second instruction VH264F which is stored in destination register $VR_a$ is eight pixels P0, P1, P2, P3, Q0, Q1, Q2, and Q3 is calculated based on tables 1.2, 1.3, 1.4 and 1.5 below depending on the input conditions as follows:

TABLE 1.2

| Condition | Output | Clip | | Value |
|---|---|---|---|---|
| | | Min | Max | |
| Strong && | P0 | 0 | 255 | $(p2 + 2p1 + 2p0 + 2q0 + q1 + 4) >> 3$ |
| (ApD&&SG) && | P1 | 0 | 255 | $(p2 + p1 + p0 + q0 + 2) >> 2$ |
| Enable | P2 | 0 | 255 | $(2p3 + 3p2 + p1 + p0 + q0 + 4) >> 3$ |
| | P3 | | | p3 |
| Strong && | Q0 | 0 | 255 | $(q2 + 2q1 + 2q0 + 2p0 + p1 + 4) >> 3$ |
| (AqD&&SG) && | Q1 | 0 | 255 | $(q2 + q1 + q0 + p0 + 2) >> 2$ |
| Enable | Q2 | 0 | 255 | $(2q3 + 3q2 + q1 + q0 + p0 + 4) >> 3$ |
| | Q3 | | | q3 |
| Strong && NOT | P0 | 0 | 255 | $(2p1 + p0 + q1 + 2) >> 2$ |
| (ApD&&SG) && | P1 | | | p1 |
| Enable | P2 | | | p2 |
| | P3 | | | p3 |
| Strong && NOT | Q0 | 0 | 255 | $(2q1 + q0 + p1 + 2) >> 2$ |
| (AqD&&SG) && | Q1 | | | q1 |
| Enable | Q2 | | | q2 |
| | Q3 | | | q3 |

TABLE 1.3

| Condition | Output | Clip | | Value |
|---|---|---|---|---|
| | | Min | Max | |
| Enable | Delta | −C | C | Udelta |
| | p1D | −C0 | C0 | Up1D |
| | q1D | −C0 | C0 | Uq1D |
| NOT Strong && ApD&& Enable | P0 | 0 | 255 | p0 + Delta |
| | P1 | | | p1 + p1D |
| | P2 | | | p2 |
| | P3 | | | p3 |
| NOT Strong && AqD && | Q0 | 0 | 255 | q0 + Delta |
| | Q1 | | | q1 + q1D |

TABLE 1.3-continued

| Condition | Output | Clip | | Value |
|---|---|---|---|---|
| | | Min | Max | |
| Enable | Q2 | | | q2 |
| | Q3 | | | q3 |

TABLE 1.4

| Condition | Output | Clip | | Value |
|---|---|---|---|---|
| | | Min | Max | |
| Enable | Delta | −C | C | Udelta |
| NOT Strong && NOT ApD && Enable | P0 | 0 | 255 | p0 + Delta |
| | P1 | | | p1 |
| | P2 | | | p2 |
| | P3 | | | p3 |
| NOT Strong && NOT AqD && Enable | Q0 | 0 | 255 | q0 + Delta |
| | Q1 | | | q1 |
| | Q2 | | | q2 |
| | Q3 | | | q3 |

TABLE 1.5

| Condition | Output | Clip | | Value |
|---|---|---|---|---|
| | | Min | Max | |
| NOT Enable | P0 | | | p0 |
| | P1 | | | p1 |
| | P2 | | | p2 |
| | P3 | | | p3 |
| NOT Enable | Q0 | | | q0 |
| | Q1 | | | q1 |
| | Q2 | | | q2 |
| | Q3 | | | q3 |

It should be appreciated that in the H.264 codec, the VH264FT instruction is performed on each row of 4×8 block of 16 bit pixels. Then the result is applied to the same 4×8 block of pixels in the VH264F instruction. The 4×8 block of pixels comprises 8 pixels in each row, input in image order, that span across an edge between 2 pixel blocks. FIG. 6 is a pixel diagram illustrating the 4×8 block of pixels as pixels from two adjacent blocks with a block edge between four pixels of blocks A and B in each row.

Figure 7:
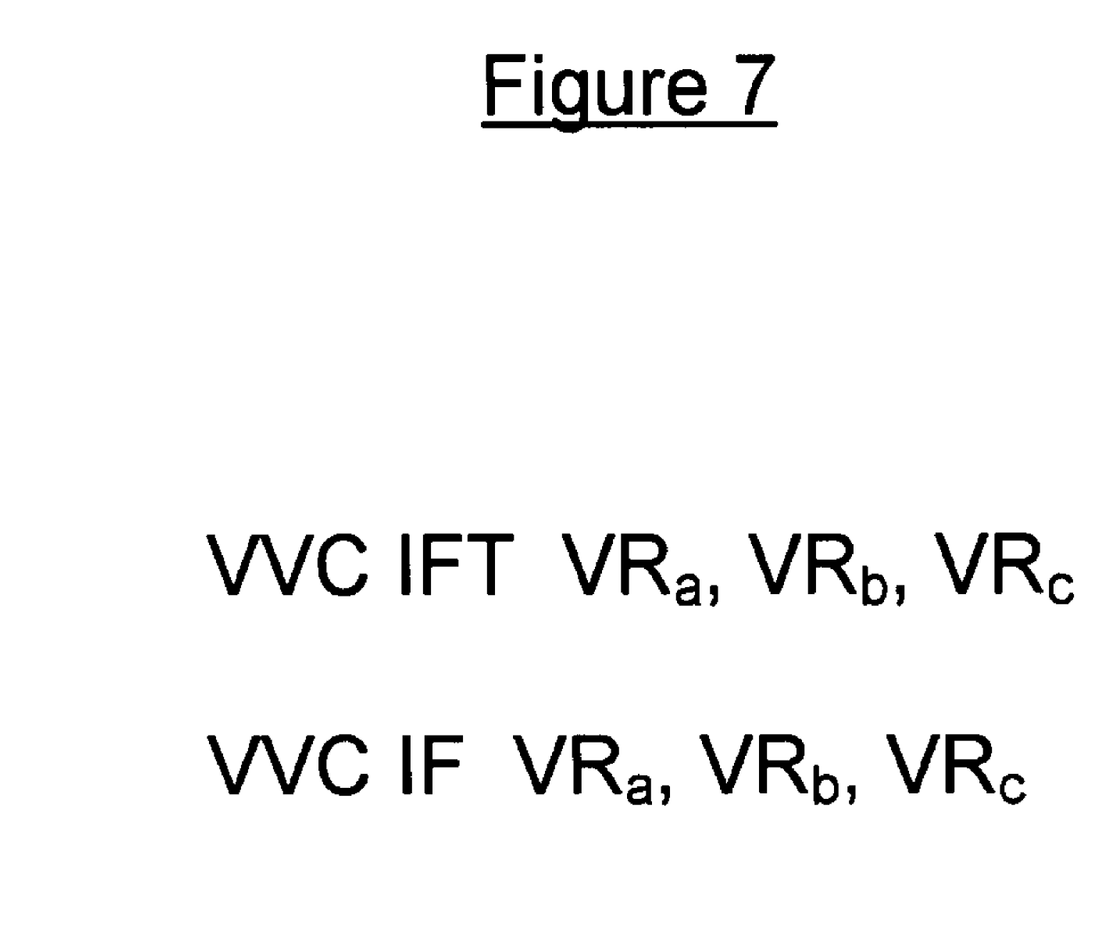
FIG. 7 is a pair of single-cycle SIMD assembler instructions for implementing the VC1 deblock filter operation on a horizontal line of pixels according to at least one embodiment of the invention.
Figure 8:
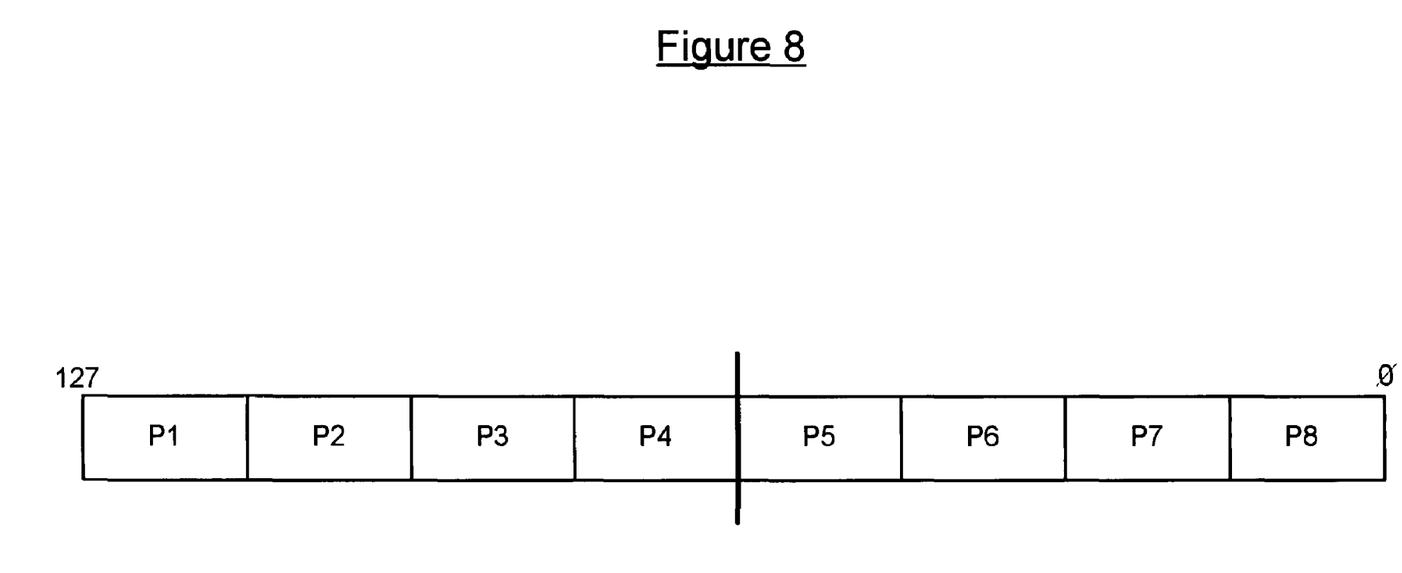
FIG. 8 is a block diagram illustrating the contents of a 128-bit register containing the first input operand to the deblock instruction of FIG. 7 according to at least one embodiment of the invention.
Figure 9:
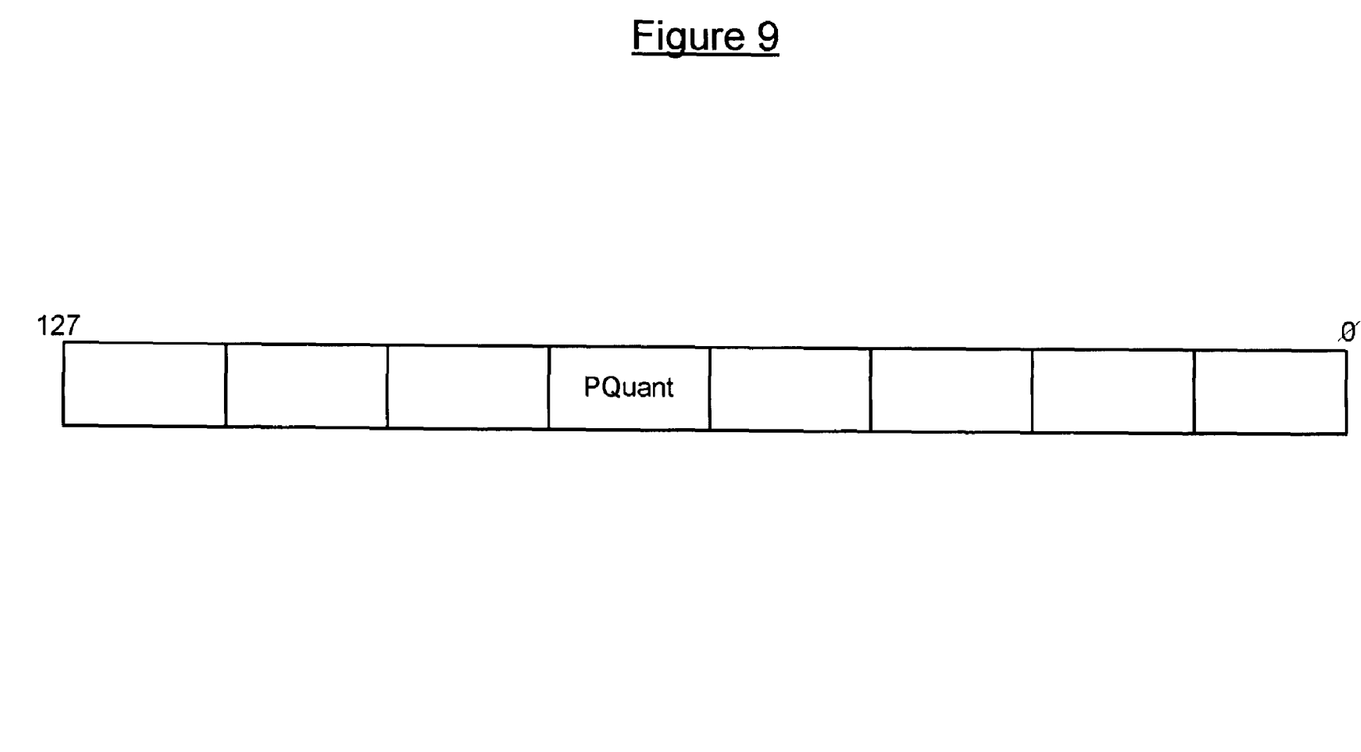
FIG. 9 is a block diagram illustrating the contents of a 128-bit register containing the second input operand, the VC1 filter quantization parameter, to the deblock instruction, of FIG. 7 according to at least one embodiment of the invention.

FIG. 7 depicts a pair of single-cycle SIMD assembler instructions for implementing the VC1 deblock filter operation on a horizontal line of pixels according to at least one embodiment of the invention. It should be appreciated that in contrast to the H.264 codec where the filter instructions according to the embodiments of the present invention are applied only the luma components, in the VC1 codec, the filter instructions are applied to both the luma and chroma components. The instructions are formatted by name, output register $VR_a$, first input register $VR_b$ and second input register $VR_c$. FIG. 8 illustrates the contents of the 128-bit register $VR_b$ containing the first input operand to the first deblock instruction VVC1FT of FIG. 6. The operand comprises a 128-bit wide data consisting of a horizontal row of eight 16-bit pixels from two adjacent blocks, that is, pixels P1-P8. FIG. 9 illustrates the contents of a 128-bit register containing the second input $VR_c$, to the deblock instruction VVC1FT of FIG. 7, in this case, just the VC1 filter quantization parameter. Only one of the 16-bit portions of the register is used to store this value. This parameter is derived directly from section 8.6.4 of the VC1 specification.

Figure 10:
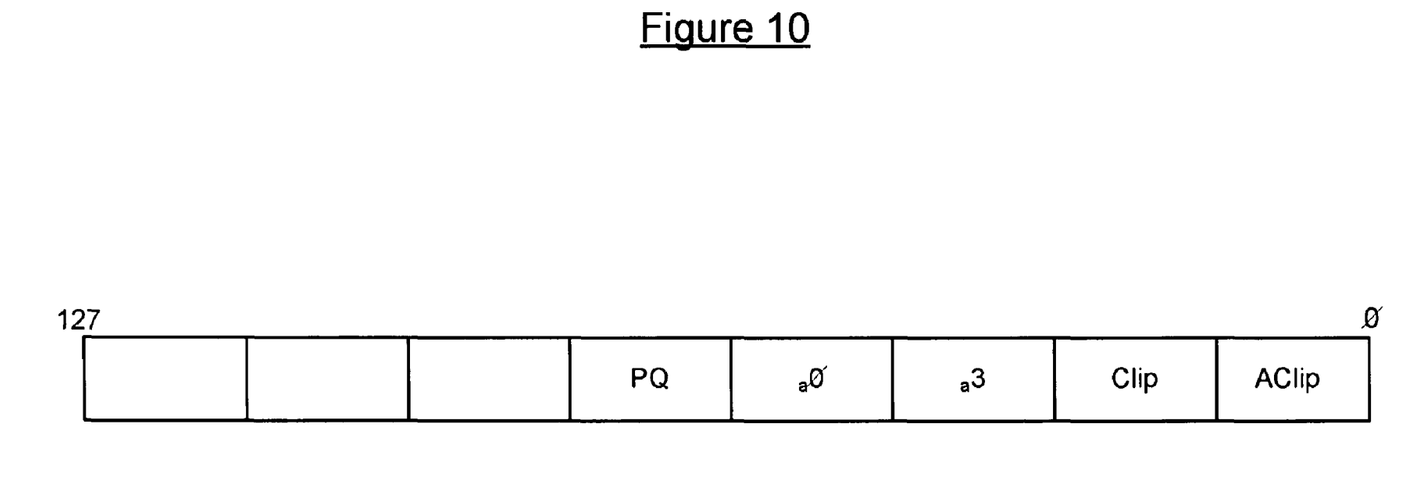
FIG. 10 is a block diagram illustrating the contents of a 128-bit register containing the output of the first deblock instruction split into eight 16-bit fields with data in the first five fields which is used as the second input operand to the second deblock instruction according to at least one embodiment of the invention.

FIG. 10 illustrates the output of the first deblock instruction VVC1FT in register $VR_a$ which in this case is comprised of five values PQ, a0, a3, Clip and Aclip, derived from table 2.1 as follows:

TABLE 2.1

| Output | Clip | | Value | Bits |
|--------|------|------|-------|------|
|        | Min  | Max  |       |      |
| PQ     |      |      | PQUANT&(\|a0\| < PQUANT&&clip! = 0&&a3 < \|a0\|) | 8 |
| a0     |      |      | (2 * (p3 − p6) − 5 * (p4 − p5) + 4) >> 3 | 8 |
| a1     |      |      | \|(2 * (p1 − p4) − 5 * (p2 − p3) + 4) >> 3\| | 8 |
| a2     |      |      | \|(2 * (p5 − p8) − 5 * (p6 − p7) + 4) >> 3\| | 8 |
| a3     |      |      | min(a1, a2) | 8 |
| clip   |      |      | (p4 − p5)/2 | 8 |
| Aclip  |      |      | \|clip\| | 8 |

The second instruction VVC1F also takes two input operands, $VR_b$ and $VR_c$ which, contain the same pixel data input to the first instruction VVC1FT and the content of the output register of the first instruction respectively. The results of the second instruction VVC1 F are output to the destination register address specified by input $VR_a$. The VC1 instructions have a slightly different usage than the H.264 ones. The result is 8 pixels P1-P8 calculated according to Table 2.2 as follows:

TABLE 2.2

| Output | Clip | | Value |
|--------|------|------|-------|
|        | Min  | Max  |       |
| Da     | 0    | Aclip | (5 * sign(a0) * a3 − a0) * sign(clip)) >> 3 |
| D      |      |      | da * sign(clip)&PQ! = 0 |
| P1     |      |      | P1 |
| P2     |      |      | P2 |
| P3     |      |      | P3 |
| P4     | 0    | 255  | P4 − d |
| P5     | 0    | 255  | P5 + d |
| P6     |      |      | P6 |
| P7     |      |      | P7 |
| P8     |      |      | P8 |

The VC1 test instruction is designed to be used in special order on a group of four registers. In the VC1 codec, the VVC1FT instruction must be executed on the $3^{rd}$ row first. If, based on this, it turns out that the other rows shouldn't be filtered, the PQ parameter is zeroed. This implies that d will also be zeroed, therefore, P4 and P5 won't change. However, VVC1FT still needs to be executed for the other rows to produce clip, a0 and a1, which are row specific.

Thus, through the use of the H.264 and VC1 codec deblocking instructions disclosed above, significant performance gains are achieved by performing the horizontal filtering operation on adjacent pixel data in a row without the overhead of transposing the data into columns and then back into rows. Even for vertical filtering (at least for VC1), it is much faster to transpose the block, apply the deblock instructions, and transpose back again than doing the deblock without the special instructions.

The embodiments of the present inventions are not to be limited in scope by the specific embodiments described herein. For example, although many of the embodiments disclosed herein have been described with reference to systems and methods for performing deblock filtering in microprocessor-based video codecs, the principles herein are equally applicable to other aspects of microprocessor design and function. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein

The invention claimed is:

1. A method of causing a microprocessor to perform a CODEC deblocking operation on a horizontal row of image pixels across a block edge comprising:
    providing a first instruction to the microprocessor having three 128-bit operands comprising:
        16-bit components of a horizontal row of pixels in a YUV image as a first input operand, wherein the horizontal row of pixels are in image order and include four pixels on either side of a pixel block edge;
        at least one filter threshold parameter as a second input operand; and
        a destination operand of a 128-bit register for storing an output of the first instruction as a third operand;
    calculating an output value of the first instruction;
    storing the output value of the first instruction in the 128-bit destination register specified in the third operand of the first instruction;
    providing a second instruction to the microprocessor having three 128-bit operands comprising:
        the first input operand of the first instruction as a first input operand;
        the output of the first instruction as a second input operand; and
        a destination operand of a 128-bit register for storing an output of the second instruction as a third operand;
    calculating an output value of the second instruction; and
    storing the output value of the second instruction in the 128-bit register specified in the third operand of the second instruction.

2. The method according to claim 1, comprising a method of causing a microprocessor to perform a CODEC deblocking operation as specified in the H.264 specification.

3. The method according to claim 2, wherein perform a CODEC deblocking operation as specified in the H.264 specification comprises performing a deblocking operation with the first instruction on each horizontal row of a 4×8 block of 16-bit luma components that crosses a block edge between a fourth and a fifth pixel column position; and
    performing a deblocking operation with the second instruction on each row of the block of 16-bit luma components, using outputs of the first instruction as inputs.

4. The method according to claim 2, wherein providing the first instruction to the microprocessor having at least one filter threshold parameter as a second input operand comprises providing a series of filter threshold parameters as a second input operand.

5. The method according to claim 2, wherein providing a series of filter threshold parameters as a second input operand comprises providing H.264 filter threshold parameters, as specified in the H.264 specification.

6. The method according to claim 1, comprising a method of causing a microprocessor to perform a CODEC deblocking operation as specified in the VC1 specification.

7. The method according to claim 1, wherein performing a CODEC deblocking operation on a horizontal row of pixels as specified in the VC1 specification comprises performing a deblocking operation with the first instruction on one row of a of a 4×8 block of 16-bit components that crosses a block edge between a fourth and a fifth pixel column position; and
performing a deblocking operation with the second instruction on each row of the 4×8 block of 16-bit components using outputs of the first instruction as inputs.

8. The method according to claim 6, wherein providing the first instruction to the microprocessor having at least one filter threshold parameter as a second input operand comprises providing a VC1 filter quantization parameter, as specified in the VC1 specification, as a second input operand.

9. The method according to claim 2, wherein calculating an output value of the first instruction comprises calculating values from parameters derived from the H.264 specification.

10. The method according to claim 2, wherein calculating an output value of the second instruction comprises deriving values from parameters derived from the H.264 specification.

11. The method according to claim 6, wherein calculating an output value of the first instruction comprises calculating values from parameters derived from the VC1 specification.

12. The method according to claim 6, wherein calculating an output value for the second instruction comprises calculating values from parameters derived from the VC1 specification.

13. A method of performing a deblock operation on a horizontal row of 8 pixels with a pair of three input operand, assembly language-based instructions comprising:
selecting 16-bit components of a horizontal row of eight pixels in a YUV image as a first input operand of a first instruction, wherein the row of eight pixels comprises four horizontal pixels in image order on either side of a block edge;
defining at least one filter threshold parameter as a second input operand of the first instruction;
calculating a first intermediate value based on the first input operand and second input operand; and
storing the first intermediate value in a 128-bit destination register specified in a third input operand of the first instruction;
selecting the same pixel inputs as a first input operand of a second instruction;
selecting the first intermediate value as a second input operand of the second instruction;
calculating an output value of second instruction based on the first input operand and the second input operand of the second instruction; and
storing the output value of the second instruction in a 128-bit destination register specified in a third input operand of the second instruction.

14. The method according to claim 13, comprising a method of performing a deblock operation on a horizontal row of 8 pixels with a pair of three operand assembly language-based instructions as specified in the H.264 specification.

15. The method according to claim 14, wherein calculating a first intermediate value based on the first input operand and the second input operand comprises performing a deblocking operation on four rows of an 4×8 block of 16-bit luma components that crosses a block edge between a fourth and a fifth pixel column position with the first instruction; and
performing a deblocking operation on the same block of luma components with the second instruction, using outputs of the first instruction as inputs.

16. The method according to claim 14, wherein defining at least one filter threshold parameter as a second input operand of the first instruction comprises providing H.264 filter threshold parameters, as specified in the H.264 specification.

17. The method according to claim 13, comprising a method of performing a deblock operation on a horizontal row of 8 pixels with a pair of three input operand assembly language-based instructions as specified in the VC1 specification.

18. The method according to claim 14, wherein calculating a first intermediate value based on the first input operand and the second input operand comprises performing a performing a deblocking operation on one row of an 4×8 block of 16-bit components that crosses a block edge between the fourth and fifth pixel column positions with the first instruction; and
performing a deblocking operation on all four rows of the 4×8 block of components with the second instruction, using outputs of the first instruction as inputs.

19. The method according to claim 17, wherein defining at least one filter threshold parameter as a second input operand of the first instruction comprises providing a VC1 filter quantization parameter, as specified in the VC1 specification, as a second input operand.

20. The method according to claim 14, wherein calculating a first intermediate value based on the first input operand and second input operand comprises calculating values from parameters derived from the H.264 specification.

21. The method according to claim 14, wherein calculating an output value of the second instruction based on the first input operand and the first intermediate value comprises deriving values from parameters derived from the H.264 specification.

22. The method according to claim 17, wherein calculating a first intermediate value based on the first input operand and the second input operand comprises calculating values from parameters derived from the VC1 specification.

23. The method according to claim 17, wherein calculating an output value of the second instruction based on the first input operand and the first intermediate value comprises calculating values from parameters derived from the VC1 specification.

24. The method according to claim 5, wherein the H.264 filter threshold parameters are alpha and beta, strong flag, and filter strength C0.

25. The method according to claim 16, wherein the H.264 filter threshold parameters are alpha and beta, strong flag, and filter strength C0.

26. The method according to claim 9, wherein values are calculated for C, beta, C0, Udelta, Up1D, Uq1D, and Flags based on values of the first input operand and the second input operand.

27. The method according to claim 10, wherein values are derived for eight pixels P0, P1, P2, P3, Q0, Q1, Q2, and Q3 based on the values of the first input operand and the output of the first instruction.

28. The method according to claim 11, wherein values are calculated for PQ, a0, a3, Clip, and Aclip.

29. The method according to claim 12, wherein values are derived for eight pixels P1-P8 based on the values of the first input operand and the output of the second instruction.

30. The method according to claim 20, wherein values are calculated for C, beta, C0, Udelta, Up1D, Uq1D, and Flags based on values of the first input operand and the second input operand.

31. The method according to claim 21, wherein values are derived for eight pixels P0, P1, P2, P3, Q0, Q1, Q2, and Q3 based on the values of the first input operand and the first intermediate value.

32. The method according to claim 22, wherein values are calculated for PQ, a0, a3, Clip, and Aclip.

33. The method according to claim 23, wherein values are derived for eight pixels P1-P8 based on the values of the first input operand and the first intermediate value.

\* \* \* \* \*

UNITED STATES PATENT AND TRADEMARK OFFICE
CERTIFICATE OF CORRECTION

| | | |
|---|---|---|
| PATENT NO. | : 7,747,088 B2 | Page 1 of 1 |
| APPLICATION NO. | : 11/528327 | |
| DATED | : June 29, 2010 | |
| INVENTOR(S) | : Graham et al. | |

It is certified that error appears in the above-identified patent and that said Letters Patent is hereby corrected as shown below:

In the Cover Page:

Item (54), Title: "System" and Methods for Performing Deblocking in Microprocessor-Based Video Codec Applications

Title should read: --Systems-- and Methods for Performing Deblocking in Microprocessor-Based Video Codec Applications [emphasis added]

Col. 1, line 1, Title: "System" and Methods for Performing Deblocking in Microprocessor-Based Video Codec Applications Title should read: --Systems-- and Methods for Performing Deblocking in Microprocessor-Based Video Codec Applications [emphasis added]

Signed and Sealed this

Twenty-fourth Day of August, 2010

David J. Kappos
*Director of the United States Patent and Trademark Office*